United States Patent
Okada et al.

(10) Patent No.: US 7,107,486 B2
(45) Date of Patent: Sep. 12, 2006

(54) RESTORE METHOD FOR BACKUP

(75) Inventors: Wataru Okada, Odawara (JP);
Hirokazu Ikeda, Yamato (JP);
Masahide Sato, Noda (JP)

(73) Assignee: Hitachi, Ltd., Tokyo (JP)

( * ) Notice: Subject to any disclaimer, the term of this patent is extended or adjusted under 35 U.S.C. 154(b) by 183 days.

(21) Appl. No.: 10/866,865

(22) Filed: Jun. 15, 2004

(65) Prior Publication Data

US 2005/0240813 A1   Oct. 27, 2005

(30) Foreign Application Priority Data

Apr. 8, 2004   (JP)   ............... 2004-114179

(51) Int. Cl.
*G06F 11/00* (2006.01)
(52) U.S. Cl. ........................... 714/20; 714/6
(58) Field of Classification Search .............. 714/6, 714/15, 20
See application file for complete search history.

(56) References Cited

U.S. PATENT DOCUMENTS

| | | | |
|---|---|---|---|
| 5,634,052 A | 5/1997 | Morris | |
| 5,720,026 A | 2/1998 | Uemura et al. | |
| 6,397,229 B1 | 5/2002 | Menon et al. | |
| 6,397,307 B1 | 5/2002 | Ohran | |
| 6,487,561 B1 * | 11/2002 | Ofek et al. | 707/204 |
| 6,496,944 B1 * | 12/2002 | Hsiao et al. | 714/15 |
| 6,779,093 B1 * | 8/2004 | Gupta | 711/162 |
| 6,871,271 B1 | 3/2005 | Ohran et al. | |
| 6,941,490 B1 * | 9/2005 | Ohran | 714/15 |
| 2001/0013102 A1 | 8/2001 | Tsuchiya et al. | |
| 2003/0084372 A1 * | 5/2003 | Mock et al. | 714/15 |
| 2003/0217119 A1 * | 11/2003 | Raman et al. | 709/219 |
| 2004/0163009 A1 * | 8/2004 | Goldstein et al. | 714/6 |
| 2005/0060609 A1 | 3/2005 | El-Batal et al. | |
| 2005/0076261 A1 * | 4/2005 | Rowan et al. | 714/6 |
| 2005/0114731 A1 * | 5/2005 | Lomet et al. | 714/15 |
| 2005/0240813 A1 * | 10/2005 | Okada et al. | 714/14 |

FOREIGN PATENT DOCUMENTS

| | | |
|---|---|---|
| JP | 9-101912 | 4/1997 |
| JP | 2001-290686 | 10/2001 |

* cited by examiner

*Primary Examiner*—Bryce P. Bonzo
(74) *Attorney, Agent, or Firm*—Mattingly, Stanger, Malur, & Brundidge, P.C.

(57) ABSTRACT

To provide a storage management device capable of performing restore at a high speed. In the storage management device that manages backup and restore of data stored in a storage device, a temporary restored image is created by applying each required delta image to the full backup image, a reverse delta image before the application of the applied delta image is created, and a number of delta application blocks concerning the applied delta image is recorded as cost information of applying delta. The delta backup restore unit determines a restore method by comparing a number of blocks, which is changed when restore is performed by applying each piece of the reverse delta image, with a number of blocks, which is changed when the restore is performed by applying each delta image, with reference to the cost information of applying delta.

20 Claims, 13 Drawing Sheets

FIG. 7

COST TABLE OF APPLYING DELTA

| DELTA | REVERSE DELTA | NUMBER OF BLOCKS |
|---|---|---|
| FULL BACKUP | | 40 |
| DELTA A | DELTA A$^{-1}$ | 5 |
| DELTA B | DELTA B$^{-1}$ | 9 |
| DELTA C | DELTA C$^{-1}$ | 6 |
| DELTA D | DELTA D$^{-1}$ | 5 |
| DELTA E | DELTA E$^{-1}$ | 6 |
| DELTA F | DELTA F$^{-1}$ | 5 |
| ... | ... | ... |

FIG. 8

BACKUP MANAGEMENT TABLE

| BACKUP CREATION DATE AND TIME | DATA |
|---|---|
| 2003/12/26 10:00 | FULL BACKUP A |
| 2003/12/27 10:00 | DELTA A |
| 2003/12/28 10:00 | DELTA B |
| 2003/12/29 10:00 | DELTA C |
| 2003/12/30 10:00 | DELTA D |
| 2003/12/31 10:00 | DELTA E |
| 2004/1/1 10:00 | DELTA F |
| ... | ... |

RESTORE METHOD FOR BACKUP

CLAIM OF PRIORITY

The present application claims priority from Japanese application P2004-114179 filed on Apr. 8, 2004, the content of which is hereby incorporated by reference into this application.

BACKGROUND

It is related to a method of restoring a backup image, and in particular to a restore method for delta backup.

Generally, in information systems, data backup is performed for the quick recovery at the time of occurrence of faults. When a fault occurs in an information system, a user recovers the information system to its state before the fault occurrence by restoring a backup image at a specific point in time.

In particular, block-level delta backup is an effective way of backing up a large-capacity disk volume. In more detail, regarding such delta backup, a delta backup system is proposed which includes a storage device that is accessed in units of blocks having a predetermined size and stores data that is a target of backup, a latest update generation management mechanism that manages delta map information recording latest backup generations in which data in the respective blocks has been updated, and a delta management mechanism that receives data in each block in the storage system updated in a specified backup generation based on the delta map information and stores the data in the block, a position of the block in the storage system, and a backup generation, in which the block has been updated, in a backup device as a backup image. With this construction, it becomes possible to make backups in multiple generations only of each updated block on a disk, which increases the efficiency and reliability of backup work (refer to JP 09-101912 A).

Also, a technique is proposed with which at the time of backup of a shared disk, a cache control unit reflects data in a write cache of each computer in data on the shared disk, a copy management unit collectively copies data in multiple blocks of the shared disk to a backup medium, a block management unit and a group management unit list up each block that is a target of backup, and a log management unit saves a log of each computer on a log medium, thereby achieving efficient data backup (refer to JP 2001-290686 A).

SUMMARY

In such delta backup, at the time of restore, multiple delta images are automatically applied to thereby reduce the complexity of the restore. However, a time-related problem concerning the restore is not yet solved. That is, it is required to perform restore multiple times at the time of a search for an image that should be restored, so that a long time is taken by the restore.

Also, in terms of a storage capacity, it is unrealistic to hold a merge result of delta images in every generation. Therefore, for the sake of restore, there is no other way but to hold multiple delta images. In this case, after an image in a certain generation is restored, when an image in a generation before the certain generation becomes necessary, a temporary restored image is discarded and at least one delta image is applied to full backup, which results in a situation where a long time is taken by a search for an image that should be restored.

For providing solutions to at least one technical problems, at the time of application of each required delta image, reverse a delta image information for applying reverse the delta image is created and cost information of applying delta is also created in which the number of blocks of a full backup and the number of blocks to be changed through application of each delta image are recorded.

That is, there is provided a storage management device comprising: a control unit that manages backup and restore of data stored in a storage device using a full backup image obtained by copying a whole of the data stored in the storage device at a predetermined timing and each delta image obtained by copying a data changed after one of the full backup and delta backup, wherein the control unit creates a temporary restored image by applying each required delta image to the full backup image, creates a reverse delta image before the application of the delta image, records a number of delta application blocks of the applied delta image as cost information of applying delta, and determines a restore method by comparing a number of blocks, which will be changed when restore is performed by applying each piece of the reverse delta image with a number of blocks, which will be changed when the restore is performed by applying each delta image with referring to the cost information of applying delta.

According to the embodiment described above, it becomes possible to perform restore at higher speed.

BRIEF DESCRIPTION OF THE DRAWINGS

FIG. 7 is an explanatory diagram of a cost table of applying delta according to the embodiment.

FIG. 8 is an explanatory diagram of a delta backup management table according to the embodiment.

DESCRIPTION OF THE PREFERRED EMBODIMENTS

An embodiment of the present invention will now be described with reference to the accompanying drawings.

Figure 1:
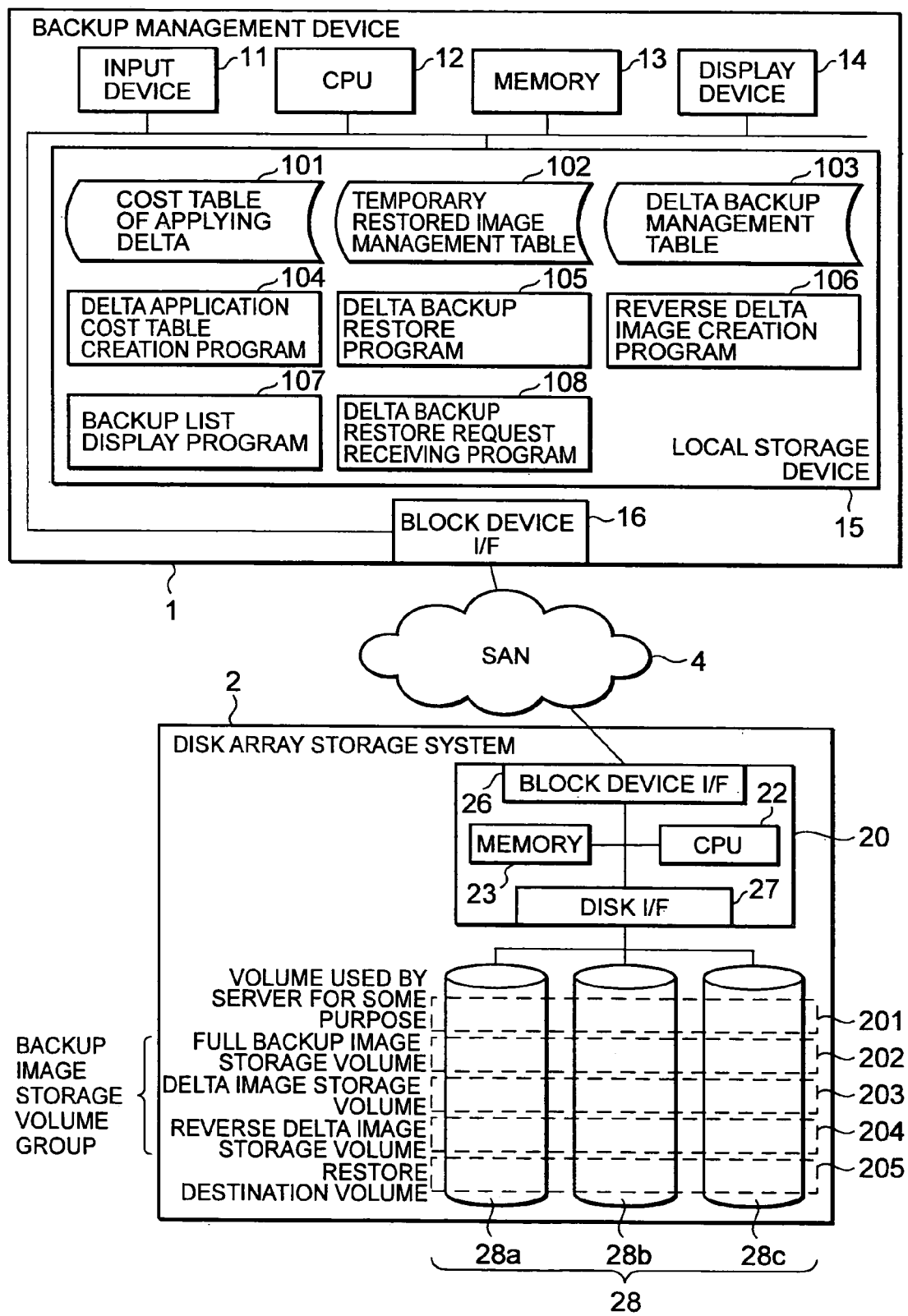
FIG. 1 is a block diagram of a storage system according to an embodiment.

FIG. 1 is a block diagram showing a construction of a storage system according to the embodiment.

The storage system according to this embodiment includes a backup management device 1, a disk array storage system 2, and a network (SAN) 4 through which the backup management device 1 and the disk array storage system 2 are connected to each other.

The backup management device 1 is a computer device including an input device 11, a CPU 12, a memory 13, a display device 14, a storage device (disk) 15, and a block device interface 16. In the backup management device 1, various application programs are executed and enable the use of a database service, a Web service, and the like by using data supplied from the disk array storage system 2. That is, the backup management device 1 also has a function of a primary server.

The storage device 15 stores a cost table of applying delta 101, a temporary restored image management table 102, and a delta backup management table 103. The storage device 15 also stores a delta application cost table creation program 104, a delta backup restore program 105, a reverse delta image creation program 106, a backup list display program 107, and a delta backup restore request receiving program 108. Through the execution of these programs by the CPU 12, various kinds of processing are realized.

The cost table of applying delta 101 stores delta images expressing respective generations of delta backup, the reverse delta image, and the numbers of blocks (see FIG. 7). This table is used to judge which images should be applied at the time of restore processing.

The temporary restored image management table 102 stores management data for managing a temporary restored image stored in a restore destination volume 205.

The delta backup management table 103 stores management data for managing delta images stored in a delta image storage volume 203 (see FIG. 8).

The delta application cost table creation program 104 creates the cost table of applying delta 101.

Figure 9:
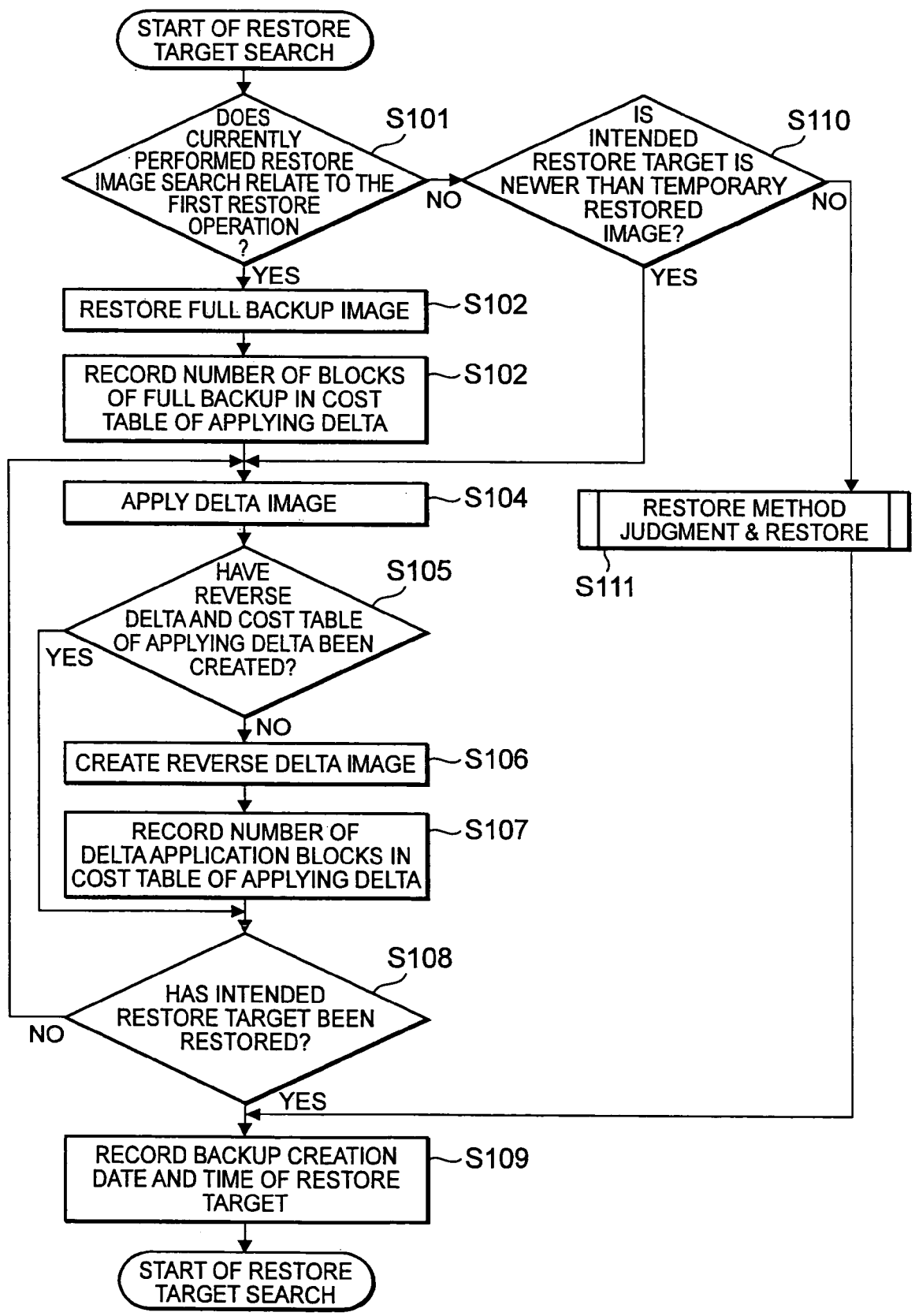
FIG. 9 is a flowchart of restore target search processing according to the embodiment.
Figure 10:
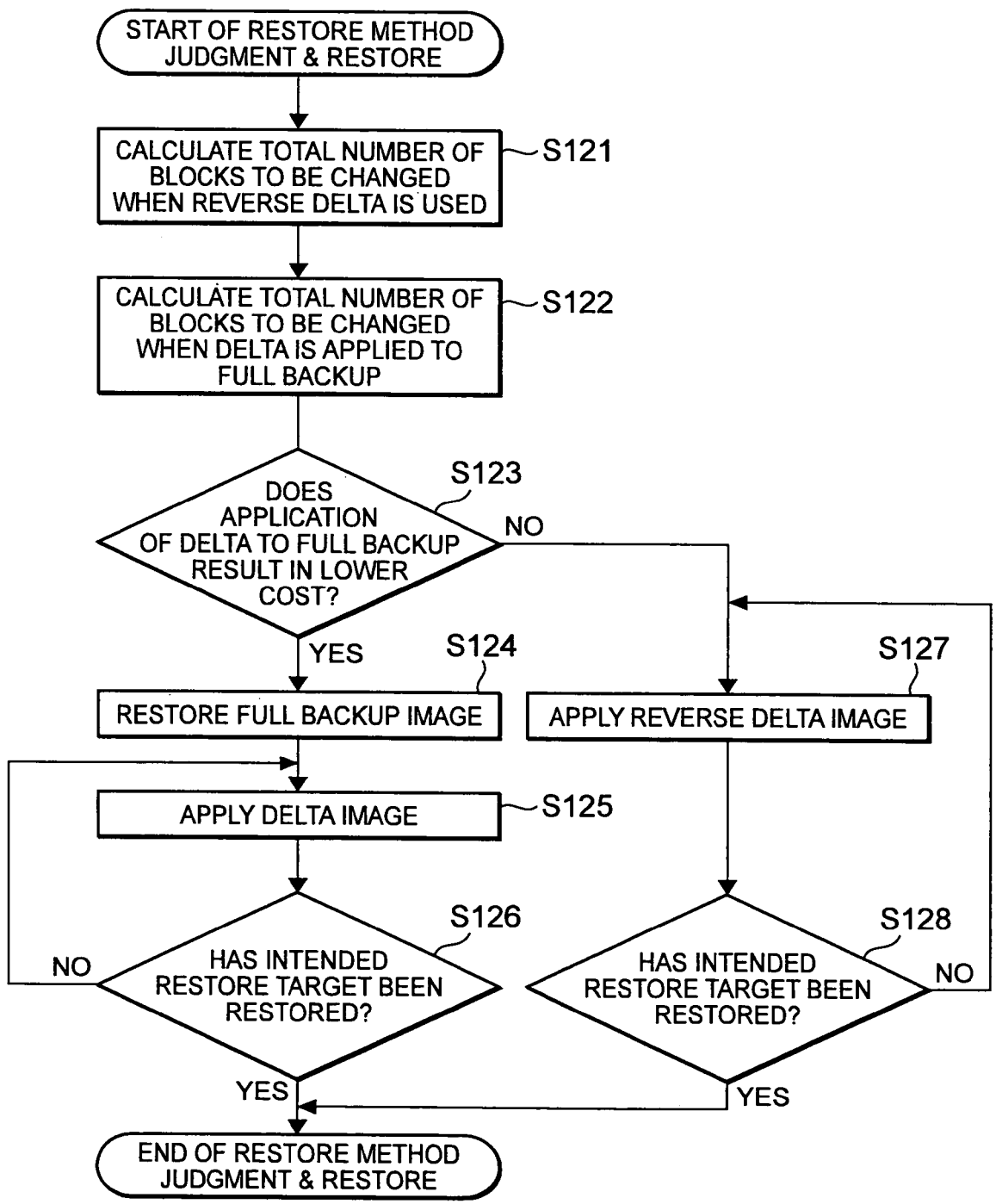
FIG. 10 is a flowchart of restore processing according to the embodiment.

The delta backup restore program 105 carries out restore by applying each required delta image to a full backup image or applying each required the reverse delta image to a temporary restored image (see FIGS. 9 and 10).

The reverse delta image creation program 106 creates reverse delta images 304.

The backup list display program 107 provides a user with a list of backup creation dates and times recorded in the delta backup management table 103 in response to a request from the user. When a logical fault or the like occurs and an image immediately before the occurrence of the fault becomes necessary, the user anticipates a backup, in which the image immediately before the fault occurrence is stored, with reference to the list of the backup creation dates and times and performs temporary restore.

The delta backup restore request receiving program 108 receives a backup acquisition date and time concerning a backup image to be temporarily restored from the user. It should be noted that instead of the backup acquisition date and time, the delta backup restore request receiving program 108 may receive the generation of the backup image.

On receiving the backup acquisition date and time of the backup image to be temporarily restored from the user, the delta backup restore request receiving program 108 requests the delta backup restore program 105 to temporarily restore the image at the designated point in time. The user confirms whether any abnormality like a logical fault occurs in the image temporarily restored by the delta backup restore program 105. If any abnormalities are found in the temporary restored image, the user provides the delta backup restore request receiving program 108 with another backup acquisition date and time preceding the previously designated backup acquisition date and time to restore a backup image preceding the temporary restored image. It should be noted that even if no abnormality is found in the temporary restored image, when it is required to perform a further search in order to, for instance, confirm an image other than the temporary restored image, the user provides the delta backup restore request receiving program 108 with another backup acquisition date and time preceding or succeeding the previously designated backup acquisition date and time.

The block device interface 16 is an interface to the disk array storage system 2 and performs communication using a protocol, such as Fibre Channel, that is suited for data transfer. It should be noted that the block device interface 16 may be an interface that performs the communication using SCSI (small computer system interface) or iSCSI (internet SCSI) instead of Fibre Channel.

The disk array storage system 2 is connected to the backup management device 1 through the SAN 4 and includes a disk array controller 20 and a disk array 28. The disk array controller 20; includes a CPU 22, a memory 23, a block device interface 26, and a disk interface 27.

The memory 23 stores a control program that is called and executed by the CPU 22 and controls data input/output into/from the disk array 28 based on a request from a computer device such as the backup management device 1. Also, the memory 23 is provided with a cache in which data to be transferred between the block device interface 26 and the disk interface 27 is temporarily stored.

The block device interface 26 is an interface to the SAN 4 and is used to transfer data and a control signal with the backup management device 1 based on the Fibre Channel protocol or the like.

The disk interface 27 is an interface to the disk array 28 and is used to transfer the data and the control signal with disk drives 28a to 28c using ATA, SAS, Fibre Channel, or the like.

The disk array 28 includes multiple physical disk drives 28a to 28c. Set in these disk drives is a logical unit (LU) that is a unit which can be recognized by an operating system as a single disk. Also, the logical unit is formed based on a RAID (redundant array of independent disks) system and gives redundancy to stored data. With this construction, it becomes possible to prevent the loss of the stored data even if a fault occurs to any part of the disk drives. It should be noted that it does not matter whether each logical unit is a disk array (collection of multiple storage devices) like a RAID array, one disk drive, an independent storage device, or a part of multiple storage devices.

Also, the disk array 28 is provided with a primary volume used by a server for some purpose 201, a full backup image storage volume 202, a delta image storage volume 203, a reverse delta image storage volume 204, and a restore destination volume 205. Here, the full backup image storage volume 202, the delta image storage volume 203, and the reverse delta image storage volume 204 constitute a backup image storage volume group.

In the primary volume used by a server for some purpose 201, data is written based on a data write request from the backup management device 1, with the written data being provided to the backup management device 1 based on a data read request.

In the full backup image storage volume 202, the whole of the data stored in the primary volume used by a server for some purpose 201 is copied and is stored as a full backup image at a predetermined timing (at a predetermined time, for instance).

In the delta image storage volume 203, data in a block changed since previous backup (full backup or delta backup)

is copied and is stored as a delta image at a predetermined timing (at intervals shorter than those for the full backup, for instance).

In the reverse delta image storage volume 204, an image before the application of a delta image created in restore target search processing (step S106 in FIG. 9) is stored as the reverse delta image 304. The user verifies whether a temporary restored image stored in the restore destination volume 205 is an image that should be restored and, if a result of this verification is positive, the temporary restored image is copied from the restore destination volume 205 to the primary volume used by a server for some purpose 201. On the other hand, if the result of the verification is negative because, for instance, a logical fault or the like has already occurred in the temporary restored image, the restore target search processing is executed again.

It should be noted that the restore destination volume 205 may be used as the primary volume used by a server for some purpose 201. With this construction, it becomes possible to reduce the number of volumes required at the time of restore and also to eliminate the necessity to copy the temporary restored image from the restore destination volume to the primary volume used by a server for some purpose.

The restore destination volume 205 stores the temporary restored image created in the restore target search processing (see FIG. 9) through application of each required delta image to a full backup image.

The block device interface 26 is an interface to the backup management device 1 and performs communication using a protocol, such as Fibre Channel, that is suited for data transfer. It should be noted that the block device interface 26 may be an interface that performs the communication using SCSI or iSCSI instead of Fibre Channel.

The SAN 4 is a network over which communication is performed using a protocol, such as the Fibre Channel protocol, that is suited for data transfer.

Next, a backup technique applied to the storage system according to this embodiment will be described.

Figure 2:
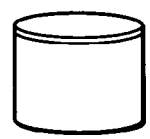
FIG. 2 is a conceptual diagram of backup techniques that are generally applicable to a storage system.

FIG. 2 is a conceptual diagram of backup techniques that are generally applicable to a storage system and shows changes over time of the contents of a primary volume used by a server for some purpose, from/to which ordinary reading/writing is performed.

Here, backup is broadly classified into full backup, incremental backup, and delta backup. This embodiment relates to a technique adapted to restore in the delta backup.

In the full backup, each time a backup (T1, T2, . . . ) is created, the whole of the volume is backed up regardless of the presence or absence of a change in each block. This full backup has an advantage that management is simple and restore is easy, but has a disadvantage that a long time is taken by the backup and therefore a time, during which the system is stopped in order to perform the backup, is elongated.

In the incremental backup, each block that has been changed since a point in time of a previous full backup is backed up. That is, at, a point in time T5 in FIG. 2, data at block addresses "3", "4", "5", and "8" changed since the previous full backup (T1) is backed up. This incremental backup has a feature that it is possible to perform backup processing faster than the full backup and management and restore are easier than the delta backup.

In the delta backup, each portion changed since a point in time of previous backup (full backup or delta backup) is backed up. When a point in time T3 in FIG. 2 is considered, for instance, only data at a block address "5" changed since a point in time T2 is backed up and data at block addresses "3" and "4" not changed since the point in time T2 are not backed up at this point in time T3. In this delta backup, the amount of data that is a target of backup is reduced and a time taken by the backup is shortened, so that it becomes possible to shorten a time during which the system is stopped in order to perform the backup. In particular, this delta backup is effective in the case where the size of a volume that is a target of backup is large and the number of blocks changed is small. However, a restore procedure is complicated and it is required to perform complicated management, which leads to various problems such as a problem in that a long time is taken by restore.

Here, the features and problems of the delta backup applied to the storage system according to this embodiment will be described.

Figure 3:
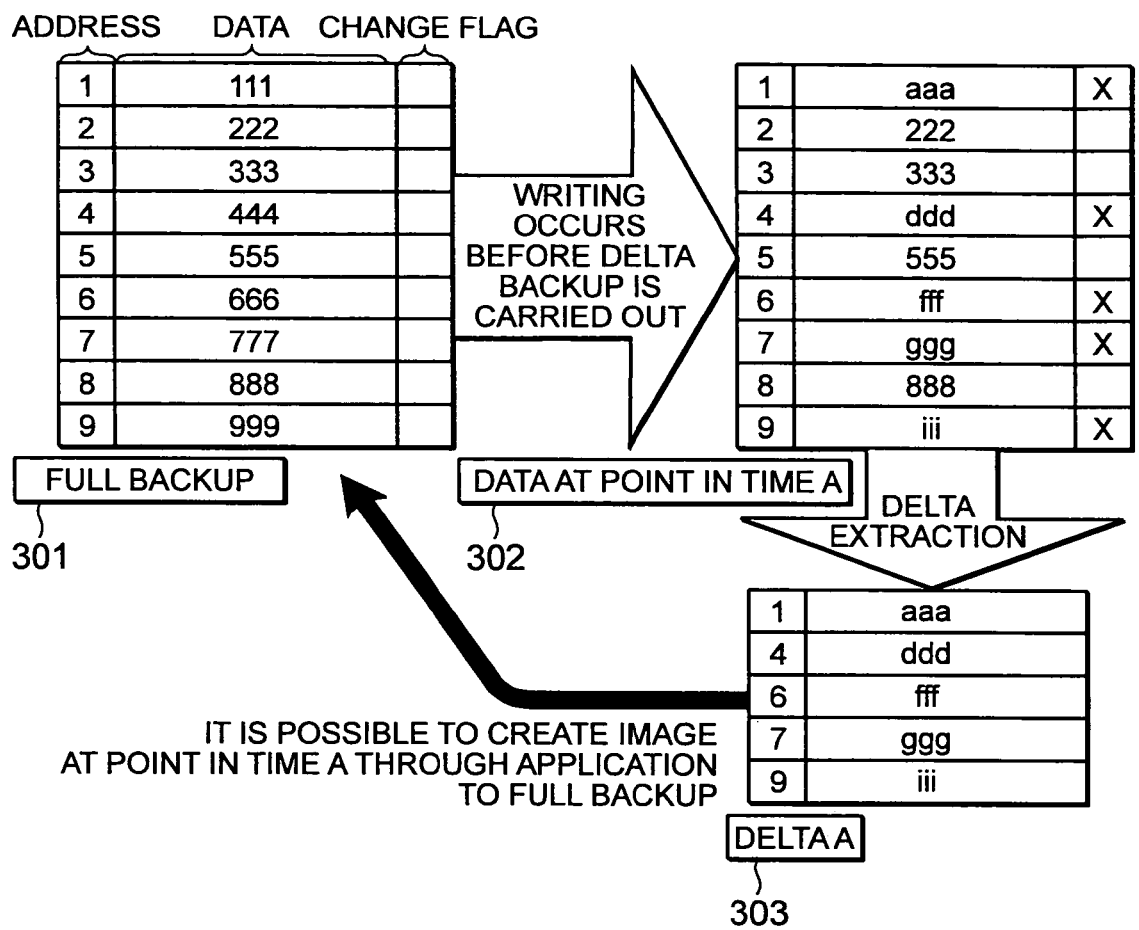
FIG. 3 is an explanatory diagram of creation of a delta image in delta backup.

FIG. 3 is an explanatory diagram of creation of a delta image in the delta backup.

When writing occurs after a full backup image 301 is created, a change flag is set for each block in which the writing occurred. When the current time has reached a delta backup date and time (point in time A in the case of FIG. 3), data in each block, for which the change flag has been set, is extracted from data 302 at that point in time and is recorded as a delta image (delta A) 303 at the point in time A.

In other words, when the delta A 303 is applied to the full backup image 301, data at block addresses (1, 4, 6, 7, and 9) corresponding to the delta A is rewritten and an image of the data 302 at the point in time A is created.

Figure 4:
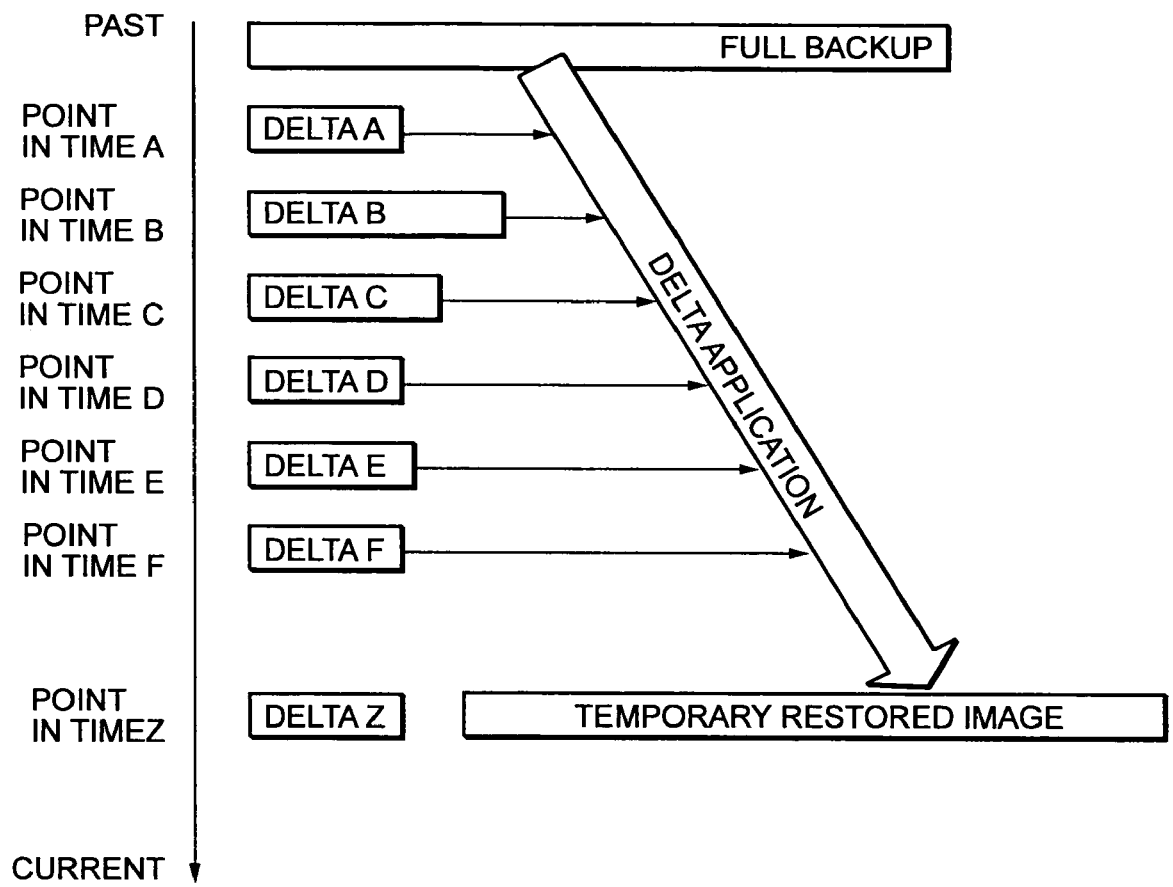
FIG. 4 is a conceptual diagram of creation of a restored image.
Figure 5:
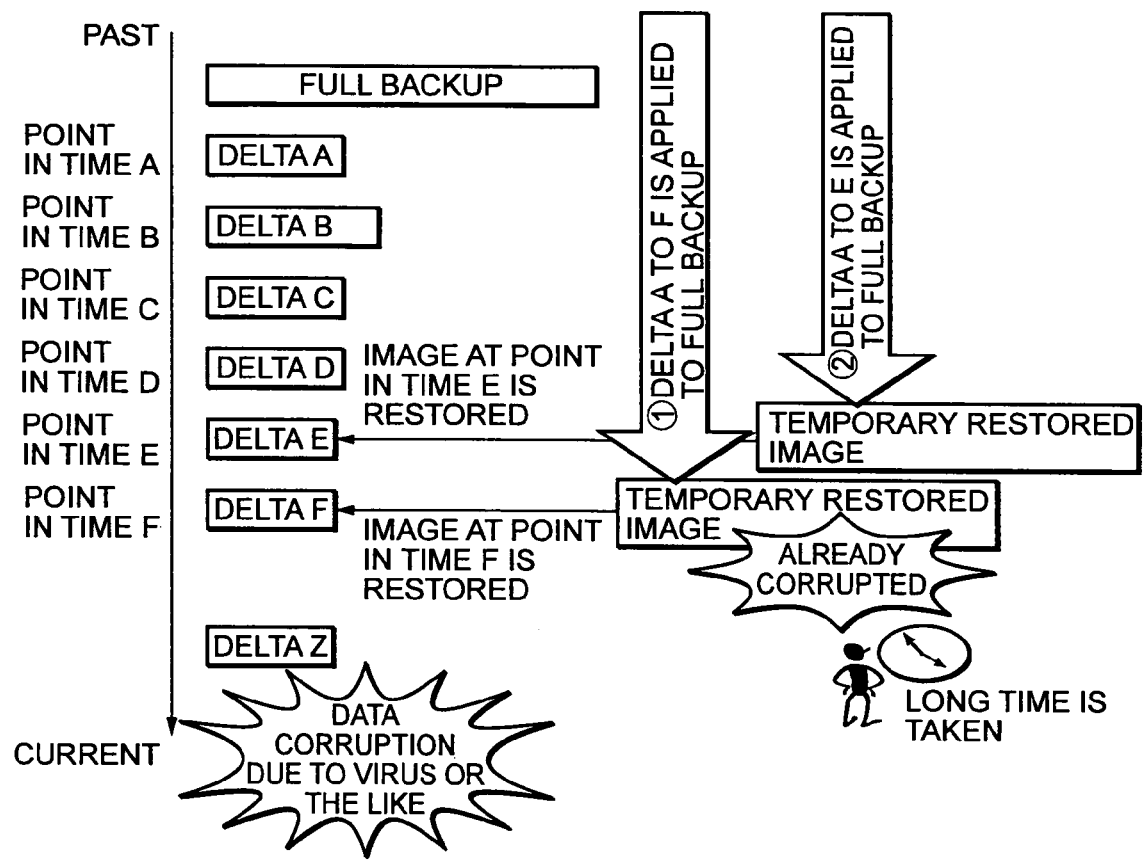
FIG. 5 is an explanatory diagram of an actual procedure of the restored image creation.

FIGS. 4 and 5 are each an explanatory diagram of creation of a restored image.

FIG. 4 shows a concept of the restored image creation. In order to obtain an image at a required point in time (point in time Z in the case of this drawing), delta images (delta A to Z) from a point in time of full backup to the required point in time (point in time Z) are applied to a full backup image, thereby creating a restored image at the point in time Z.

FIG. 5 shows an actual procedure of the restored image creation.

When data corruption due to a virus or the like is found at the point in time Z, a user selects an appropriate point in time (point in time F in the case of this drawing) and applies images of the delta A to F to the full backup image, thereby creating a temporary restored image at the point in time F. When the image of the delta F is already corrupted, however, the temporary restored image at the point in time F is meaningless and a temporary restored image at a point in time (point in time E in the case of this drawing) preceding the point in time F is created by applying the images of the delta A to E to the full backup image.

As described above, in the delta backup, temporary restore is required for data confirmation. Also, in the delta backup, at the time of restore, it is required to apply every delta image until an intended point in time to a full backup, and this causes a problem in that it is required to perform a complex operation and a long time is taken by the restore.

When a logical fault occurs in the disk array storage system 2 and an image immediately before the occurrence of the logical fault is searched for, it is required to apply every delta image until immediately before the logical fault occurrence to the full backup. Also, in order to specify the occurrence time of the logical fault, it is usually required to perform restore multiple times, so that a long time is taken by restore processing, which inhibits swift recovery.

Figure 6:
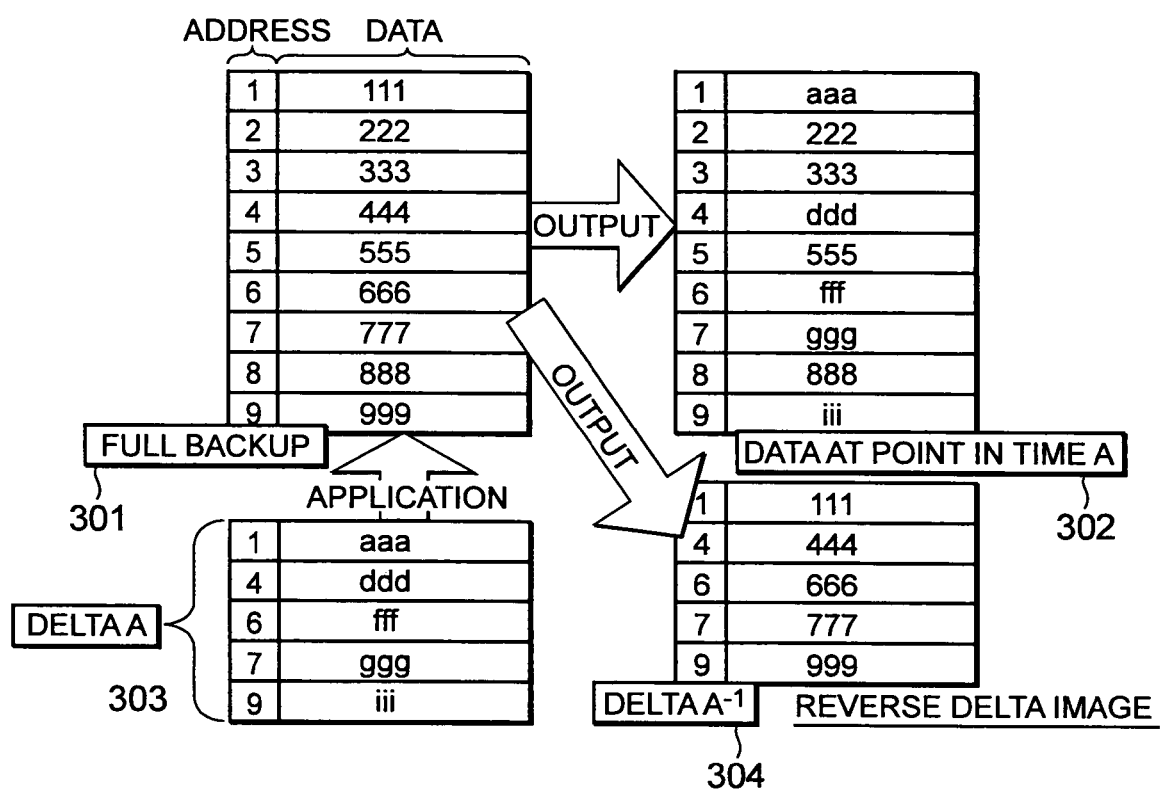
FIG. 6 is an explanatory diagram of a delta image and a reverse delta image according to the embodiment.

FIG. 6 is an explanatory diagram of a delta image and the reverse delta image according to this embodiment.

When delta A 303 is applied to a full backup image 301, data at block addresses (1, 4, 6, 7, and 9) corresponding to this delta A are rewritten and an image of data 302 at a point in time A is created. At this time, the reverse delta image 304 is created in which data before the data rewritten at the block addresses using the delta A is recorded.

The data before the application of the delta image is recorded in the reverse delta image 304, so that when the reverse delta image 304 is applied to the image of the data 302 at the point in time A, the data at the block addresses (1, 4, 6, 7, and 9) are rewritten by the reverse delta image (delta $A^{-1}$) and the full backup image 301 is obtained. That is, it is possible to obtain the image before the application of the delta A (one-generation old image) using the reverse delta image.

FIG. 7 is an explanatory diagram of the cost table of applying delta 101 according to this embodiment.

The cost table of applying delta 101 stores "delta" each of which expresses a generation of the delta backup, the reverse delta image corresponding to the delta, and the "numbers of blocks" of the delta. The cost table of applying delta 101 is used to judge which delta images should be applied at the time of restore processing.

In more detail, the cost table of applying delta 101 gives the number of blocks used by full backup and the number of blocks used at each stage of delta backup. For instance, in the illustrated example, a full backup image uses 40 blocks and a delta image A uses five blocks. By adding up the numbers of blocks used by respective delta images, it becomes possible to know the total number of blocks of each delta image to be applied in order to create a temporary restored image at a desired point in time.

FIG. 8 is an explanatory diagram of the delta backup management table 103 according to this embodiment.

In the delta backup management table 103, the kind (whether full backup or delta backup) and generation of each image and the backup creation date and time of the image are recorded so as to be associated with each other.

FIG. 9 is a flowchart of restore target search processing according to this embodiment, with this processing being executed by the delta application cost table creation program 104.

First, it is judged whether the currently performed restore image search relates to the first restore operation (S101). The creation date and time of a backup previously restored through this processing is recorded in the temporary restored image management table 102, so that it is possible to make this judgment by checking whether any date and time is stored in the temporary restored image management table 102.

As a result of this judgment, if it is found that the currently performed restore image search relates to the first restore operation, restore processing for restoring a stored full backup image is performed (S102). Then, the number of blocks of the full backup ("40" in the case of FIG. 7) is recorded in the cost table of applying delta 101 (S103) and the processing proceeds to step S104.

On the other hand, if the currently performed restore image search does not relate to the first restore operation, it is judged whether an intended restore target is newer than an already obtained temporary restored image with reference to the delta backup management table 103 (S110). Here, the temporary restored image means an image temporarily restored and stored in the restore destination volume 205.

As a result of the judgment, if it is found that the intended restore target is newer than the already obtained temporary restored image, the processing goes to step S104. On the other hand, if the intended restore target is not newer than (is older than or the same as) the already obtained temporary restored image, restore method judgment is made and restore is carried out (S111).

In step S104, a new temporary restored image is created by sequentially applying each required delta image and this temporary restored image is stored in the restore destination volume 205. That is, at this time, if no delta image is yet applied after the restore of the full backup image, a delta image (delta A in the case of FIG. 4) immediately after the full backup is applied. Then, after the application of the delta A, a delta image (delta B in the case of FIG. 4) in the next generation is applied. In this manner, a temporary restored image in a new generation is obtained. Then, the temporary restored image management table 102 is updated.

Then, it is judged whether the reverse delta image 304 and the cost table of applying delta 101 have been created for each applied delta image (S105). If it is found as a result of this judgment that the reverse delta image 304 and the cost table of applying delta 101 are not yet created for the applied delta image, the reverse delta image 304 corresponding to the applied delta image is created by the reverse delta image creation program 106 and is stored in the reverse delta image storage volume 204 (S106). Following this, the number of delta application blocks corresponding to the applied delta image is added to the cost table of applying delta 101 by the delta application cost table creation program 104 (S107).

Then, it is judged whether the intended restore target has been restored by comparing the backup creation date and time of the intended restore target with the backup creation date and time of the temporary restored image created this time with reference to the delta backup management table 103 (S108).

If it is found as a result of this judgment that the backup creation date and time of the intended restore target is equal to the backup creation date and time of the temporary restored image created this time, it is judged that the intended restore target has been restored and the backup acquisition date and time of the temporary restored image is recorded (S109). Then, the user confirms the restored image. If it is required to perform restore again because, for instance, the restored image is already corrupted, another restore target date and time is inputted and the restore target search processing described above is executed from the start.

FIG. 10 is a flowchart of restore processing according to this embodiment, with this processing being called from step S111 of the restore target search processing (see FIG. 9) and being executed.

First, by referring to the cost table of applying delta 101, the total number of blocks, which need to be changed when intended restore is performed by applying each required the reverse delta image to the temporary restored image, is calculated (S121). The number of blocks calculated in this step is the sum of the number of blocks of each required the reverse delta image that should be applied to the temporary restored image stored in the restore destination volume 205.

Next, the total number of blocks, which need to be changed when the intended restore is performed by restoring the full backup image and then applying each required delta image to the restored full backup image, is calculated (S122). The number of blocks calculated in this step is the sum of the number of blocks of the full backup image and the number of blocks of each required delta image that should be applied.

Following this, the number of blocks calculated in step S121 and the number of blocks calculated in step S122 are compared with each other (S123).

If it is found as a result of this comparison that the number of blocks calculated in step S122 is smaller than that calculated in step S121, this means that the sequential application of each required delta image to the full backup results in a fewer number of blocks to be changed, so that a backup image in an intended generation is restored by restoring the full backup image (S124) and applying each delta image that is necessary in order to reach the intended restore target to the restored full backup image (S125, S126).

On the other hand, if the number of blocks calculated in step S121 is smaller than that calculated in step S122, this means that the application of each required the reverse delta image to the temporary restored image results in a fewer number of blocks to be changed, so that the intended backup is restored by applying each reverse delta image that is necessary in order to reach the intended restore target to the temporary restored image (S127, S128).

It should be noted that when the reverse delta image and the delta images are stored in different storage media, it is sufficient to judge which restore method is used by comparing the products of the average values of the access speeds to the storage media and the numbers of blocks.

Figure 11:
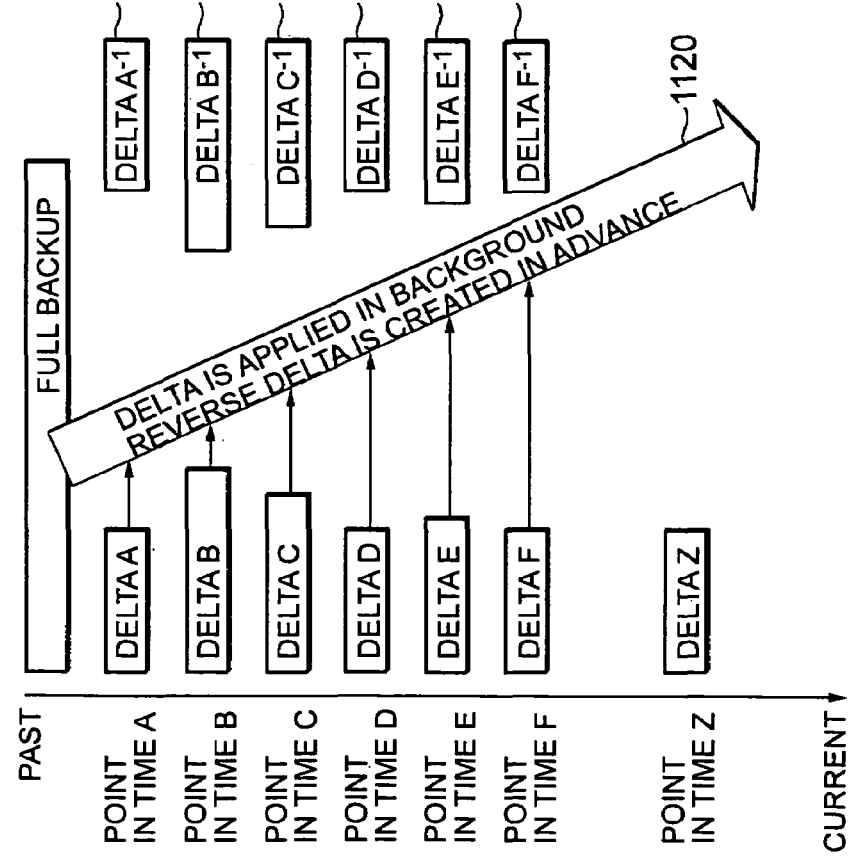
FIG. 11 is an explanatory diagram of creation of a restored image according to another embodiment.
Figure 12:
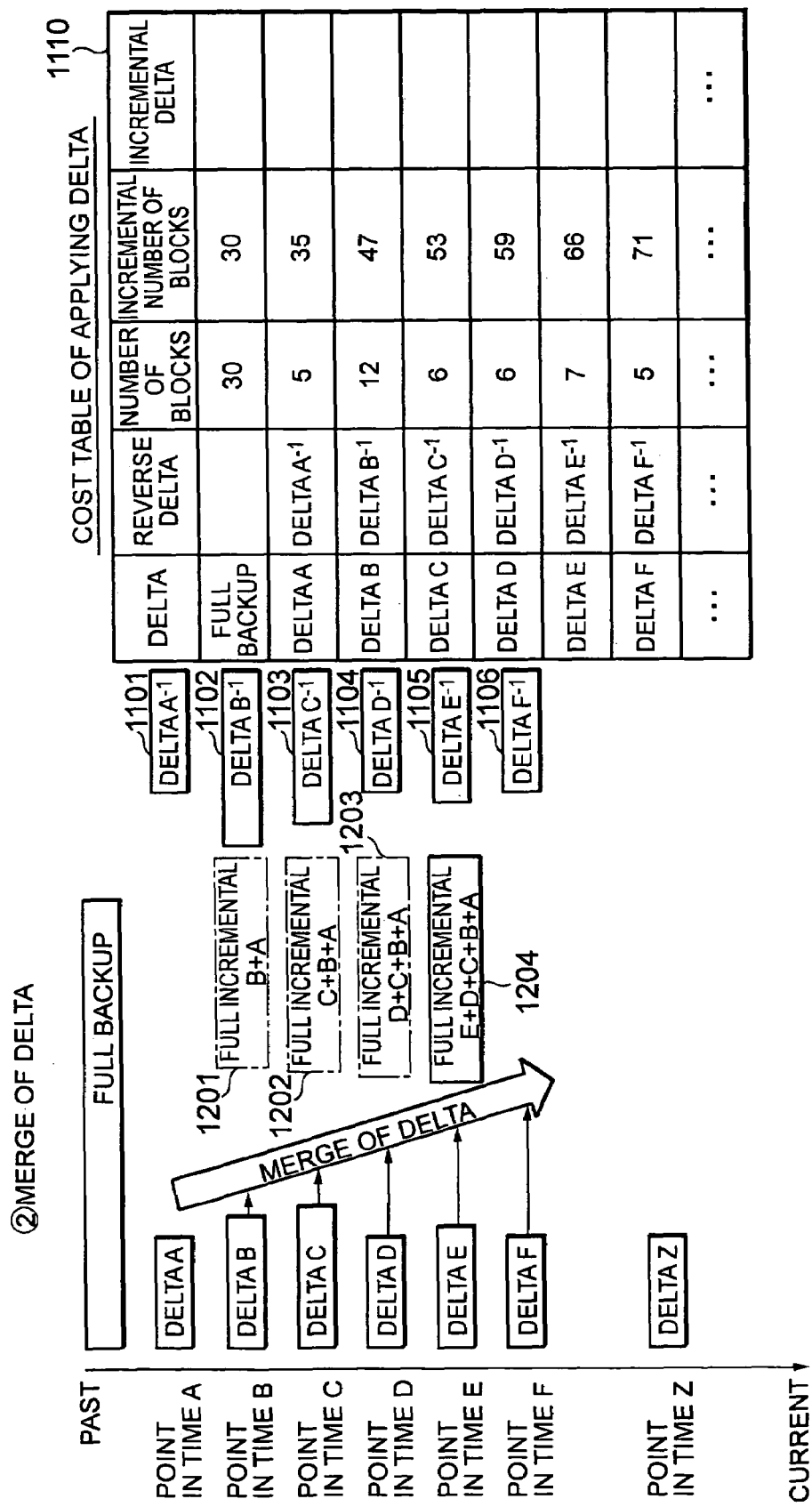
FIG. 12 is another explanatory diagram of the restored image creation according to the other embodiment.
Figure 13:
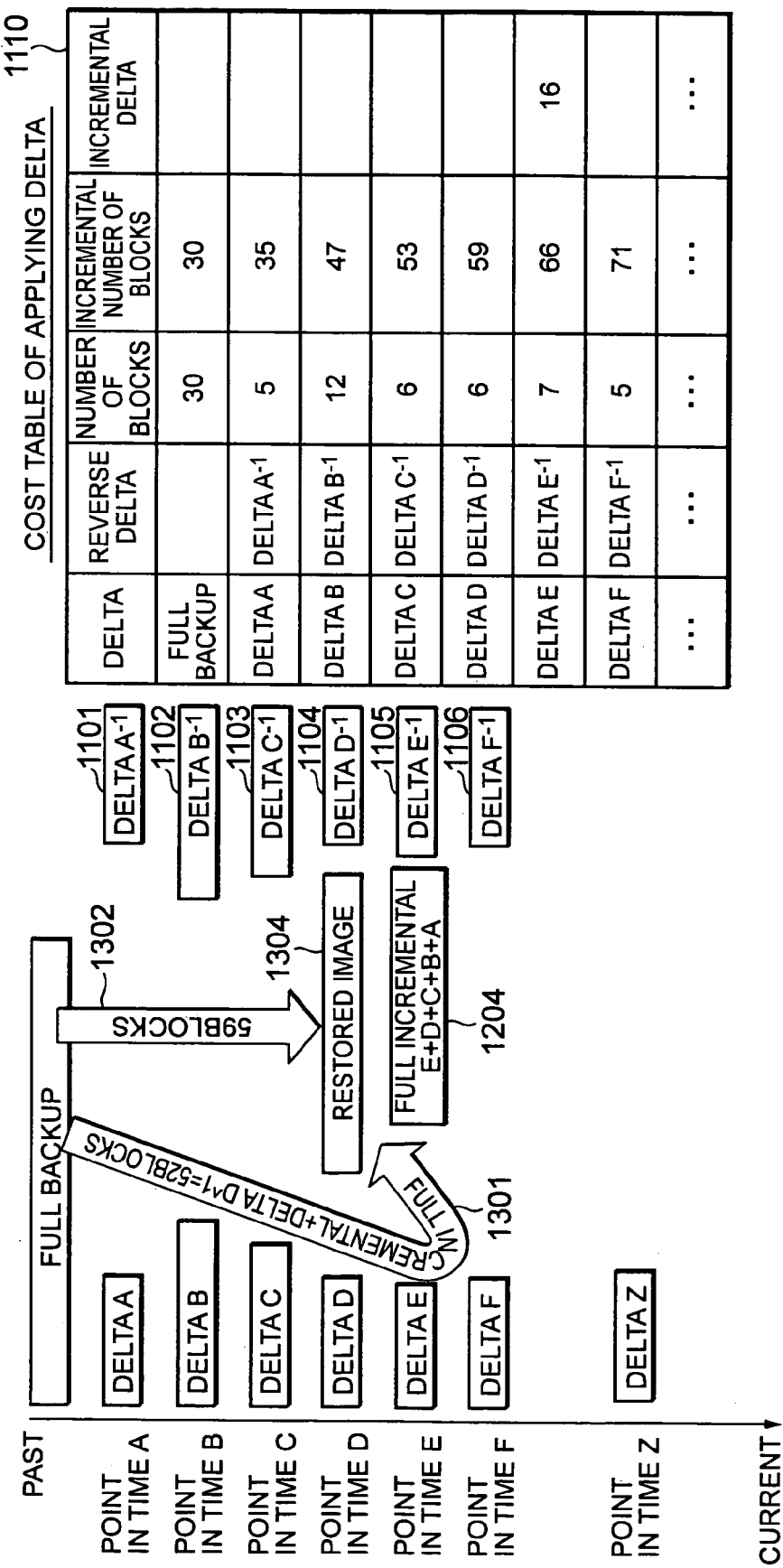
FIG. 13 is still another explanatory diagram of the restored image creation according to a further embodiment.

FIGS. 11 to 13 are each an explanatory diagram of another embodiment where a delta merge technique is further applied to the embodiment described above. In this case, it is required to provide the backup image storage volume group of the disk array storage system 2 with an incremental delta storage volume in which merged delta images are stored.

Also, a cost table of applying delta 1110 shown in FIGS. 11 to 13 has a construction in which the cost table of applying delta described above (see FIG. 7) is provided with a column for recording each incremental number of blocks and a column for recording each incremental delta. Here, the incremental number of blocks means the number of blocks obtained by sequentially adding the number of blocks of each delta (A, B, C, . . . ) until a certain point in time to the number of blocks of a full. backup. Also, the incremental delta means the number of blocks in which data at a certain point in time (point in time E in FIG. 13, for instance) differs from the full backup. This cost table of applying delta 1110 is stored in the local storage device 15 of the backup management device 1.

First, the CPU 12 creates the reverse delta image and the cost table of applying delta 1110 (1120). It should be noted that this table creation 1120 is not performed at the time of sequential execution of restore but is performed through processing corresponding to steps S104 to S107 shown in FIG. 9 as background processing when any resources of the backup management device 1 remain unused. In more detail, the CPU 12 applies the delta image A to E (corresponding to step S104), creates the reverse delta images 1101 to 1106 (corresponding to step S106), and records the numbers of blocks of the delta A to E in the "number of blocks" column of the cost table of applying delta (corresponding to step S107). This makes it possible to increase the speed of processing at the time of restore search.

Following this, the delta A to E, each of which is a delta image, are merged with each other, thereby creating an incremental image (incremental delta E+D+C+B+A) 1204 which is then stored in the incremental delta storage volume (see FIG. 12). Then, the number of blocks of the incremental image 1204 is obtained and a value "16" is recorded in the "incremental delta" column of the cost table of applying delta 1110.

Then, at the time of restore, the CPU 12 refers to the cost table of applying delta 1110 and judges which one of a method 1301, in which the incremental image 1204 and each required the reverse delta images are applied to a full backup image in this order, and a method 1302, in which each required delta image is applied to the full backup image, results in a fewer number of blocks to be changed. Then, a restored image 1304 is created by performing restore using the method in which it is possible to perform the restore with a fewer number of blocks that need to be changed.

In the case of FIG. 13, the cost table of applying delta 1110 shows that the incremental number of blocks of the full backup image is "30", the number of blocks of the incremental delta at a point in time E with respect to the full backup is "16", the number of blocks of delta $D^{-1}$ is "6", and the numbers of blocks of delta A to E are respectively "5", "12", "6", "6", and "7". Therefore, it is found through addition of these numeric values that the number of blocks that need to be changed in the case of the method 1301 is "52" and the number of blocks that need to be changed in the case of the method 1302 is "59". When the method 1301 and the method 1302 are compared with each other, the number of blocks to be changed in the case of the method 1301 is smaller than that in the case of the method 1302. Therefore, the restore is performed using the method 1301 with which the restored image 1304 is created by applying the incremental image 1204 and the delta $D^{-1}$ 1104 to the full backup image in this order.

As described above, using the delta merge technique, it becomes possible to reduce the number of blocks to be changed at the time of restore and to further increase the speed of the restore.

According to this embodiment, it becomes possible to increase the speed of a search for an image that should be restored and to provide faster restore.

That is, in a backup image search, it is possible to return a temporary restored image to a state before the application of each required delta image by applying each corresponding the reverse delta image to the temporarily restored image. Also, at the time of restore of a backup image at a certain point in time, it is possible to select a method, in which it is possible to reduce the total number of blocks to be changed and to perform the restore at higher speed, from a method, in which each required delta image is applied to a full backup image, and a method, in which each required the reverse delta image is applied to a temporary restored image. As a result, it becomes possible to increase the speed of the second and succeeding restore operations in a search for a backup image that should be restored.

Also, the background creation of each reverse delta image and the cost table of applying delta is not performed at the time of execution of restore but is performed through background processing when any resources remain unused. As a result, it becomes possible to increase the speed of processing at the time of a restore search.

While the present invention has been described in detail and pictorially in the accompanying drawings, the present invention is not limited to such detail but covers various obvious modifications and equivalent arrangements, which fall within the purview of the appended claims.

What is claimed is:

1. An image restore method executed in a storage system comprising:

a disk array storage system comprising a disk drive in which a primary volume used by a server for some purpose is set from/to which data is read and written, a block device interface that sends and receives data and control signals to/from a computer, a disk interface that sends and receives data and control signals to/from with the disk drive, a memory that stores a control program, and a CPU that executes the control program to control input and output of the data to/from the disk drive; and a backup management device that manages backup and restore of the data stored in the disk array storage system using a full backup image obtained by copying a whole of the data stored in the primary volume at a predetermined timing and each delta image obtained by copying a data changed after one of the full backup and delta backup, the image restore method comprising:

creating a temporary restored image by applying each required delta image to the full backup image and storing the temporary restored image in a restore destination volume;

judging whether the reverse delta image and a cost table of applying delta relating to each applied the delta image have been created, with each reverse delta image recording the reverse delta image before the application of the applied delta image and the cost table of applying delta recording a number of blocks of the applied delta image;

creating, if the reverse delta image and the cost table of applying delta relating to the applied delta image are not yet created, the reverse delta image related to the applied delta image and recording a number of delta application blocks relating to the applied delta image in the cost table of applying delta;

judging whether an intended restore target has been restored with reference to a backup creation date and time recorded in a delta backup management table;

recording, if it is judged that the intended restore target has been restored, a backup date and time of the restore target; and creating, if it is not judged that the intended restore target has been restored, a new temporary restored image, calculating a sum of a number of blocks of each reverse delta image that should be applied to the temporary restored image in order to reach the intended restore target with reference to the cost table of applying delta, and obtaining a number of blocks that is changed when restore is performed by applying the reverse delta image;

calculating a sum of a number of blocks of the full backup image and a total number of blocks of each delta image that should be applied to the full backup image in order to reach the intended restore target with reference to the cost table of applying delta, and obtaining a number of blocks that is changed when the restore is performed by applying the delta image;

comparing the number of blocks that is changed when the restore is performed by applying the reverse delta image with the number of blocks that is changed when the restore is performed by applying the delta image;

performing the restore by applying the reverse delta image that is necessary in order to reach an intended restore target, to the temporary restored image if the restore through the application of the reverse delta image results in a fewer number of blocks to be changed; and performing the restore by sequentially applying the delta image that is necessary in order to reach an intended restore target, to the full backup image if the restore through the application of the delta image results in a fewer number of blocks to be changed.

2. A storage management device comprising:

a control unit that manages backup and restore of data stored in a storage device using a full backup image obtained by copying a whole of the data stored in the storage device at a predetermined timing and each delta image obtained by copying a data changed after one of the full backup and delta backup, wherein the control unit creates a temporary restored image by applying each required delta image to the full backup image, creates a reverse delta image before the application of the delta image, records a number of delta application blocks relating to the applied delta image as cost information of applying delta, and determines a restore method by comparing a number of blocks, which is changed when restore is performed by applying each piece of the reverse delta image that is necessary in order to reach an intended restore target, with a number of blocks, which is changed when the restore is performed by applying each delta image that is necessary in order to reach the intended restore target, with referring to the cost information of applying delta.

3. The storage management device according to claim 2, wherein the control unit calculates a number of blocks, which is changed when the restore is performed by applying the piece of the reverse delta image to the temporary restored image, and a number of blocks, which is changed when the restore is performed by applying the delta image to the full backup image, and determines the restore method by comparing the number of blocks that is changed when the restore is performed by applying the piece of the reverse delta image to the temporary restored image with the number of blocks that is changed when the restore is performed by applying the delta image to the full backup image.

4. The storage management device according to claim 3, wherein the control unit performs the restore by applying the piece of the reverse delta image that is necessary in order to reach the intended restore target, to the temporary restored image if the restore through the application of the piece of the reverse delta image to the temporary restored image results in a fewer number of blocks to be changed, and performs the restore by sequentially applying the delta image that is necessary in order to reach the intended restore target, to the full backup image if the restore through the application of the delta image to the full backup image results in a fewer number of blocks to be changed.

5. The storage management device according to claim 2, wherein the control unit creates an incremental image using delta images in a plurality of successive generations, records a number of blocks of the created incremental image in the cost information of applying delta, calculates a number of blocks, which is changed when the restore is performed by applying the incremental image to the full backup image and then by applying each piece of the reverse delta image, and a number of blocks, which is changed when the restore is performed by applying each delta image to the full backup image, with referring to the cost information of applying delta, compares the number of blocks that is changed when the restore is performed by applying the incremental image to the full backup image and then by applying the piece of the reverse delta image with the number of blocks that is changed when the restore is performed by applying the delta image to the full backup image, performs, if the restore through the application of the incremental image to the full backup image and then the application of the piece of the reverse delta image results in a fewer number of blocks to be changed, the restore by applying the incremental image to the full backup image and then by applying the piece of the reverse delta image that is necessary in order to reach the intended restore target, and performs, if the restore through the application of the delta image to the full backup image results in a fewer number of blocks to be changed, the restore by sequentially applying the delta image that is necessary in order to reach the intended restore target, to the full backup image.

6. The storage management device according to claim 2, wherein the control unit creates the reverse delta image relating to the applied delta image when any resources of the storage management device remain unused, and records the number of delta application blocks relating to the applied delta image in the cost information of applying delta when any resources of the storage management device remain unused.

7. An image restore method executed in a storage management device comprising a control unit that manages backup and restore of data stored in a storage device using a full backup image obtained by copying a whole of the data stored in the storage device at a predetermined timing and each delta image obtained by copying a data change made after one of the full backup and delta backup, the image restore method comprising:

creating a temporary restored image by applying each required delta image to the full backup image;

creating a reverse delta image before the application of the delta image;

recording a number of delta application blocks relating to the applied delta image in cost information of applying delta;

calculating a number of blocks, which is changed when restore is performed by applying each piece of the reverse delta image, and a number of blocks, which is changed when the restore is performed by applying each. delta image, with referring to the cost information of applying delta;

comparing the number of blocks, which is changed when the restore is performed by applying the piece of the reverse delta image, with the number of blocks, which is changed when the restore is performed by applying the delta image, and determining a restore method on basis of a result of the comparison; and performing the restore using the determined method.

8. The image restore method according to claim 7, wherein a number of blocks, which is changed when the restore is performed by applying the piece of the reverse delta image to the temporary restored image, and a number of blocks, which is changed when the restore is performed by applying the delta image to the full backup image, are calculated, and the restore method is determined by comparing the number of blocks that is changed when the restore is performed by applying the piece of the reverse delta image to the temporary restored image with the number of blocks that is changed when the restore is performed by applying the delta image to the full backup image.

9. The image restore method according to claim 8, wherein if the restore through the application of the piece of the reverse delta image to the temporary restored image results in a fewer number of blocks to be changed, the restore is performed by applying the piece of the reverse delta image that is necessary in order to reach the intended restore target, to the temporary restored image, and if the restore through the application of the delta image to the full backup image results in a fewer number of blocks to be changed, the restore is performed by sequentially applying the delta image that is necessary in order to reach the intended restore target, to the full backup image.

10. The image restore method according to claim 7, wherein an incremental image is created using delta images in a plurality of successive generations, a number of blocks of the created incremental image is recorded in the cost information of applying delta, a number of blocks, which is changed when the restore is performed by applying the incremental image to the full backup image and then by applying each piece of the reverse delta image, and a number of blocks, which is changed when the restore is performed by applying each delta image to the full backup image, are calculated with referring to the cost information of applying delta, the restore method is determined by comparing the number of blocks that is changed when the restore is performed by applying the incremental image to the full backup image and then by applying the piece of the reverse delta image with the number of blocks that is changed when the restore is performed by applying the delta image to the full backup image, if the restore through the application of the incremental image to the full backup image and then the application of the piece of the reverse delta image results in a fewer number of blocks to be changed, the restore is performed by applying the incremental image to the full backup image and then by applying the piece of the reverse delta image that is necessary in order to reach the intended restore target, and if the restore through the application of the delta image to the full backup image results in a fewer number of blocks to be changed, the restore is performed by sequentially applying the delta image that is necessary in order to reach the intended restore target, to the full backup image.

11. The image restore method according to claim 7, wherein when any resources of the storage management device remain unused, the reverse delta image relating to the applied delta image is created and the number of delta application blocks relating to the applied delta image is recorded in the cost information of applying delta.

12. A computer program product for managing a storage device by a storage management device, wherein the storage management device comprising a control unit that manages backup and restore of data stored in the storage device using a full backup image obtained by copying a whole of the data stored in the storage device at a predetermined timing and each delta image obtained by copying a data change made after one of the full backup and delta backup, the program controlling the storage management device to:

create a temporary restored image by applying each required delta image to the full backup image;

create a reverse delta image before the application of the delta image;

record a number of delta application blocks relating to the applied delta image in cost information of applying delta;

calculate a number of blocks, which is changed when restore is performed by applying each piece of the reverse delta image, and a number of blocks, which is changed when the restore is performed by applying each delta image, with referring to the cost information of applying delta;

determine a restore method by comparing the number of blocks, which is changed when the restore is performed by applying the piece of the reverse delta image, with the number of blocks, which is changed when the restore is performed by applying the delta image; and perform the restore using the determined method.

13. The computer program product according to claim 12, wherein a number of blocks, which is changed when the restore is performed by applying the piece of the reverse delta image to the temporary restored image, and a number of blocks, which is changed when the restore is performed by applying the delta image to the full backup image, are calculated, and the restore method is determined by comparing the number of blocks that is changed when the restore is performed by applying the piece of the reverse delta image to the temporary restored image with the number of blocks that is changed when the restore is performed by applying the delta image to the full backup image.

14. The computer program product according to claim 13, wherein if the restore through the application of the piece of the reverse delta image to the temporary restored image results in a fewer number of blocks to be changed, the restore is performed by applying the piece of the reverse delta image that is necessary in order to reach the intended restore target, to the temporary restored image, and if the restore through the application of the delta image to the full backup image results in a fewer number of blocks to be changed, the restore is performed by sequentially applying the delta image that is necessary in order to reach the intended restore target, to the full backup image.

15. The computer program product according to claim 12, wherein an incremental image is created using delta images in a plurality of successive generations, a number of blocks of the created incremental image is recorded in the cost information of applying delta, a number of blocks, which is changed when the restore is performed by applying the incremental image to the full backup image and then by applying each piece of the reverse delta image, and a number of blocks, which is changed when the restore is performed by applying each delta image to the full backup image, are calculated with referring to the cost information of applying delta, the restore method is determined by comparing the number of blocks that is changed when the restore is performed by applying the incremental image to the full backup image and then by applying the piece of the reverse delta image with the number of blocks that is changed when the restore is performed by applying the delta image to the full backup image, if the restore through the application of the incremental image to the full backup image and then the application of the piece of the reverse delta image results in a fewer number of blocks to be changed, the restore is performed by applying the incremental image to the full backup image and then by applying the piece of the reverse delta image that is necessary in order to reach the intended restore target, and if the restore through the application of the delta image to the full backup image results in a fewer number of blocks to be changed, the restore is performed by sequentially applying the delta image that is necessary in order to reach the intended restore target, to the full backup image.

16. The computer program product according to claim 12, wherein when any resources of the storage management device remain unused, the reverse delta image relating to the applied delta image is created and the number of delta application blocks relating to the applied delta image is recorded in the cost information of applying delta.

17. A storage system comprising:

a storage device comprising a disk drive in which a primary volume is set from/to which data is read and written, a block device interface that sends and receives data and control signals to/from a computer, a disk interface that sends and receives data and control signals to/from the disk drive, a CPU that executes a control program to control input and output of the data to/from the disk drive, and a memory that stores the control program; and a storage management device comprising a control unit that manages backup and restore of the data stored in the storage device using a full backup image obtained by copying a whole of the data stored in the storage device at a predetermined timing and each delta image obtained by copying a data changed after one of the full backup and delta backup, wherein the control unit of the storage management device.

creates a temporary restored image by applying each required delta image to the full backup image, creates a reverse delta image before the application of the delta image, records a number of delta application blocks relating to the applied delta image as cost information of applying delta, and determines a restore method by comparing a number of blocks, which is changed when restore is performed by applying each piece of the reverse delta image, with a number of blocks, which is changed when the restore is performed by applying each delta image, with referring to the cost information of applying delta.

18. The storage system according to claim 17, wherein the control unit of the storage management device calculates a number of blocks, which is changed when the restore is performed by applying the piece of the reverse delta image to the temporary restored image, and a number of blocks, which is changed when the restore is performed by applying the delta image to the full backup image, and determines the restore method by comparing the number of blocks that is changed when the restore is performed by applying the piece of the reverse delta image to the temporary restored image with the number of blocks that is changed when the restore is performed by applying the delta image to the full backup image.

19. The storage system according to claim 17, wherein the control unit of the storage management device performs the restore by applying the piece of the reverse delta image that is necessary in order to reach the intended restore target, to the temporary restored image if the restore through the application of the piece of the reverse delta image to the temporary restored image results in a fewer number of blocks to be changed, and performs the restore by sequentially applying the delta image that is necessary in order to reach the intended restore target to the full backup image, to the full backup image if the restore through the application of the delta image to the full backup image results in a fewer number of blocks to be changed.

20. The storage system according to claim 17, wherein the control unit of the storage management device creates an incremental image using delta images in a plurality of successive generations, and records a number of blocks of the created incremental image in the cost information of applying delta, calculates a number of blocks, which is changed when the restore is performed by applying the incremental image to the full backup image and then by applying each piece of the reverse delta image, and a number of blocks, which is changed when the restore is performed by applying each delta image to the full backup image, with referring to the cost information of applying delta, compares the number of blocks that is changed when the restore is performed by applying the incremental image to the full backup image and then by applying the piece of the reverse delta image with the number of blocks that is changed when the restore is performed by applying the delta image to the full backup image, performs, if the restore through the application of the incremental image to the full backup image and then the application of the piece of the reverse delta image results in a fewer number of blocks to be changed, the restore by applying the incremental image to the full backup image and then by applying the piece of the reverse delta image that is necessary in order to reach the intended restore target, and performs, if the restore through the application of the delta image to the full backup image results in a fewer number of blocks to be changed, the restore by sequentially applying the delta image that is necessary in order to reach the intended restore target, to the full backup image.

* * * * *